United States Patent
Nomaru

(10) Patent No.: US 12,523,865 B2
(45) Date of Patent: Jan. 13, 2026

(54) OPTICAL PART ASSEMBLY

(71) Applicant: DISCO CORPORATION, Tokyo (JP)

(72) Inventor: Keiji Nomaru, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 292 days.

(21) Appl. No.: 18/529,798

(22) Filed: Dec. 5, 2023

(65) Prior Publication Data

US 2024/0201481 A1   Jun. 20, 2024

(30) Foreign Application Priority Data

Dec. 19, 2022   (JP) .................................. 2022-202231

(51) Int. Cl.
   *G02B 26/08*   (2006.01)
(52) U.S. Cl.
   CPC ................................ G02B 26/0858 (2013.01)
(58) Field of Classification Search
   None
   See application file for complete search history.

(56) References Cited

U.S. PATENT DOCUMENTS

| | | | | |
|---|---|---|---|---|
| 5,683,072 A * | 11/1997 | Ohmi | ........................ | C23C 8/14 251/193 |
| 6,398,373 B1 * | 6/2002 | Guzman | ............. | G03F 7/70266 359/849 |
| 9,784,966 B1 * | 10/2017 | Harrison | ............... | G02B 26/101 |
| 2003/0136309 A1 * | 7/2003 | Shinozaki | ............. | H01L 21/682 108/20 |
| 2011/0110204 A1 * | 5/2011 | Hashizume | ........ | G11B 7/08564 359/872 |
| 2017/0036301 A1 * | 2/2017 | Zhang | ................... | H01S 3/0071 |
| 2020/0409140 A1 * | 12/2020 | Sugimoto | ............. | G01J 3/0256 |
| 2024/0332046 A1 * | 10/2024 | Savandaiah | ............. | C23C 14/50 |

FOREIGN PATENT DOCUMENTS

| | | | | | |
|---|---|---|---|---|---|
| GB | 2046939 B | * | 2/1983 | ............. | G02B 26/06 |
| JP | 2005313182 A | | 11/2005 | | |
| JP | 5039122 B2 | * | 10/2012 | | |
| JP | 6676189 B2 | * | 4/2020 | | |

* cited by examiner

*Primary Examiner* — Ryan Crockett
(74) *Attorney, Agent, or Firm* — Greer Burns & Crain Ltd.

(57) ABSTRACT

An optical part assembly includes a mirror main body including a base and a mirror support section that is formed integral with the base and having a projected tip, a mirror mounted on the projected tip of the mirror support section, a casing having in its tip part an opening in which the mirror support section is exposed, and having a rear end part closed with a bottom plate, a plurality of driving sections that are disposed on the bottom plate of the casing and act on the base to swing the base, a ring member that has an opening and is fixed to a front end part of the casing, and a bellows seal of which one end makes contact with a front end of the base and the other end makes contact with the ring member to surround the mirror support section.

3 Claims, 4 Drawing Sheets

OPTICAL PART ASSEMBLY

BACKGROUND OF THE INVENTION

Field of the Invention

The present invention relates to an optical part assembly in which an optical axis of a mirror is variable.

Description of the Related Art

A wafer formed on a front surface thereof with a plurality of devices such as integrated circuits (ICs) and large-scale integration (LSI) circuits in a state of being partitioned by a plurality of intersecting streets is divided into individual device chips by a laser processing apparatus, and the thus divided device chips are used for electric apparatuses such as mobile phones and personal computers.

The laser processing apparatus includes a chuck table that holds a wafer, a laser beam applying unit that applies a laser beam to the wafer held by the chuck table, and a processing feeding mechanism that puts the chuck table and the laser beam applying unit into relative processing feeding (see, for example, Japanese Patent Laid-open No. 2005-313182).

In addition, the laser beam applying unit includes a laser oscillator that emits a laser beam, a light condenser that converges the laser beam emitted by the laser oscillator on the wafer held by the chuck table, and an optical part assembly that is disposed between the laser oscillator and the light condenser and includes a mirror for adjusting an optical path of the laser beam.

SUMMARY OF THE INVENTION

The above-mentioned optical part assembly is configured such that a driving section is connected thereto to adjust the optical path of the light reflected by the mirror and that a base to which the mirror is mounted is driven by the driving section, whereby the optical axis of the mirror can be adjusted. Hence, at the time of adjusting the optical path of the light reflected by the mirror, there arises a problem that fine dust or the like is generated from a movable part of the driving section and is scattered and the optical path of the laser beam is thereby contaminated.

Accordingly, it is an object of the present invention to provide an optical part assembly that is able to avoid the problem that fine dust is scattered from a movable part of the driving section to contaminate the optical path of a laser beam, at the time of adjusting the optical path of the light reflected by a mirror.

In accordance with an aspect of the present invention, there is provided an optical part assembly comprising a mirror main body including a base and a mirror support section that is formed integral with the base and having a projected tip, a mirror mounted on the projected tip of the mirror support section, a casing that accommodates the mirror main body, the casing having at its tip part an opening in which the mirror support section is exposed, and the casing having a rear end part closed with a bottom plate, a plurality of driving sections that are disposed on the bottom plate of the casing and act on the base to swing the base; a ring member that has an opening and is fixed to a front end part of the casing; and a bellows seal of which one end makes contact with a front end of the base, and the other end makes contact with the ring member to surround the mirror support section.

Preferably, each of the driving sections includes a piezo-actuator and a pin which is connected to the piezo-actuator and a tip of which makes contact with the base. Alternatively, each of the driving sections is mounted on outside of the bottom plate, and a connection member inserted into a through-hole formed in the bottom plate connects the driving section and the base.

According to the optical part assembly of the present invention, at the time of adjusting the optical path, the angle of the mirror of each optical part assembly can be modified to any angle, and, even if fine dust is generated at the driving sections for swinging the base, the problem that the dust is scattered into the region of the optical path of the light and the optical path is contaminated is dissolved.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

An embodiment concerning a laser applying apparatus in which an optical part assembly configured based on the present invention is disposed will be described in detail below with reference to the attached drawings.

Figure 1:
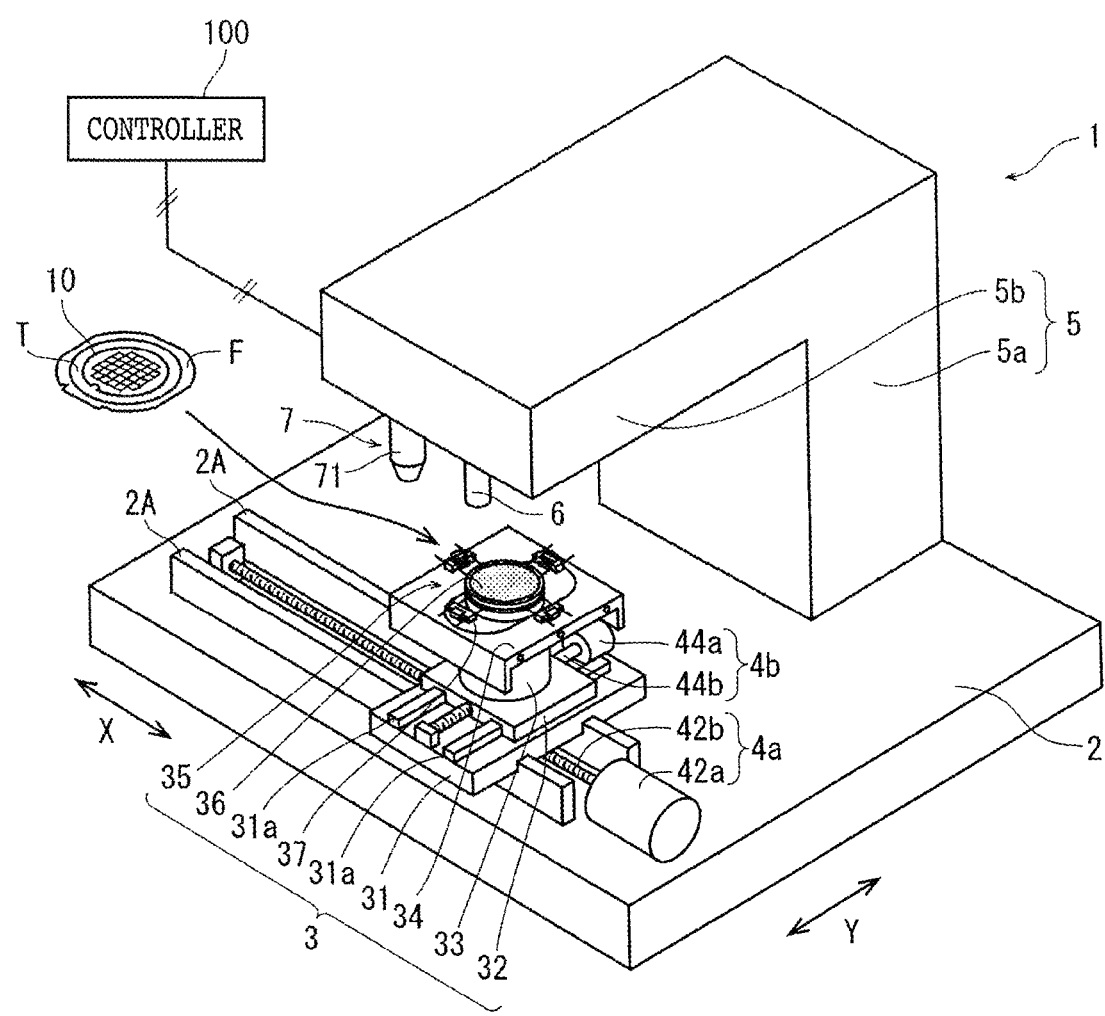
FIG. 1 is a perspective view of the whole part of a laser applying apparatus according to an embodiment of the present invention.

FIG. 1 illustrates a laser applying apparatus 1 according to the present embodiment. The laser applying apparatus 1 is, for example, an apparatus that applies laser processing to a wafer 10 (see FIG. 2 also) held by an annular frame F as illustrated through a protective tape T. The laser applying apparatus 1 includes a laser beam applying unit 7 that is disposed on a base 2 and applies a laser beam to the wafer 10.

In addition to the above-mentioned laser beam applying unit 7, the laser applying apparatus 1 includes a holding unit 3 that holds the wafer 10, an aligning unit 6 that images the wafer 10 held by the holding unit 3 and performs an aligning step, an X-axis moving mechanism 4a that moves the holding unit 3 in an X-axis direction, a Y-axis moving mechanism 4b that moves the holding unit 3 in a Y-axis direction, a frame body 5 including a vertical wall section 5a erected on a lateral side of the X-axis moving mechanism 4a and the Y-axis moving mechanism 4b on the base 2, and a horizontal wall section 5b extending in a horizontal direction from a top end part of the vertical wall section 5a, and a controller 100 that controls each of the operating sections.

The holding unit 3 is means for holding the wafer 10 with an XY plane specified by X coordinates and Y coordinates as a holding surface, and, as depicted in FIG. 1, the holding unit 3 includes a rectangular X-axis direction movable plate 31 mounted on the base 2 in such a manner as to be movable in the X-axis direction, a rectangular Y-axis direction movable plate 32 mounted on the X-axis direction movable plate 31 in such a manner as to be movable in the Y-axis direction, a cylindrical support column 33 fixed to an upper surface of the Y-axis direction movable plate 32, and a rectangular cover plate 34 fixed to an upper end of the support column 33. On the cover plate 34, a chuck table 35 extending upward through a slot formed on the cover plate 34 is disposed. The chuck table 35 is configured to be rotatable by an unillustrated rotational driving mechanism accommodated in the support column 33. On an upper surface of the chuck table 35, a circular suction chuck 36 that is formed from a porous material having a gas permeation property and that has the XY plane specified by the X coordinates and the Y coordinates as a holding surface is disposed. The suction chuck 36 is connected to unillustrated suction means via a channel passing through the support column 33, and, in the periphery of the suction chuck 36, four clamps 37 for grasping the annular frame F at the time of holding the wafer 10 on the chuck table 35 are disposed at regular intervals.

The X-axis moving mechanism 4a converts a rotational motion of a motor 42a into a rectilinear motion and transmits the rectilinear motion to the X-axis direction movable plate 31 through a ball screw 42b, to thereby move the X-axis direction movable plate 31 in the X-axis direction along a pair of guide rails 2A disposed on the base 2 along the X-axis direction. The Y-axis moving mechanism 4b converts a rotational motion of a motor 44a into a rectilinear motion and transmits the rectilinear motion to the Y-axis direction movable plate 32 through a ball screw 44b, to thereby move the Y-axis direction movable plate 32 in the Y-axis direction along a pair of guide rails 31a disposed on the X-axis direction movable plate 31 along the Y-axis direction.

Inside the horizontal wall section 5b of the frame body 5, an optical system constituting the above-mentioned laser beam applying unit 7 and the aligning unit 6 are accommodated. On a lower surface side of a tip part of the horizontal wall section 5b, a light condenser 71 that constitutes a part of the laser beam applying unit 7 and applies the laser beam to the wafer 10 is disposed. The aligning unit 6 is imaging means that images the wafer 10 held by the holding unit 3 and detects the position and orientation of the wafer 10, a laser processing position to which the laser beam is to be applied, and the like, and is disposed at a position adjacent to the above-mentioned light condenser 71 in the X-axis direction indicated by an arrow X in the figure.

Figure 2:
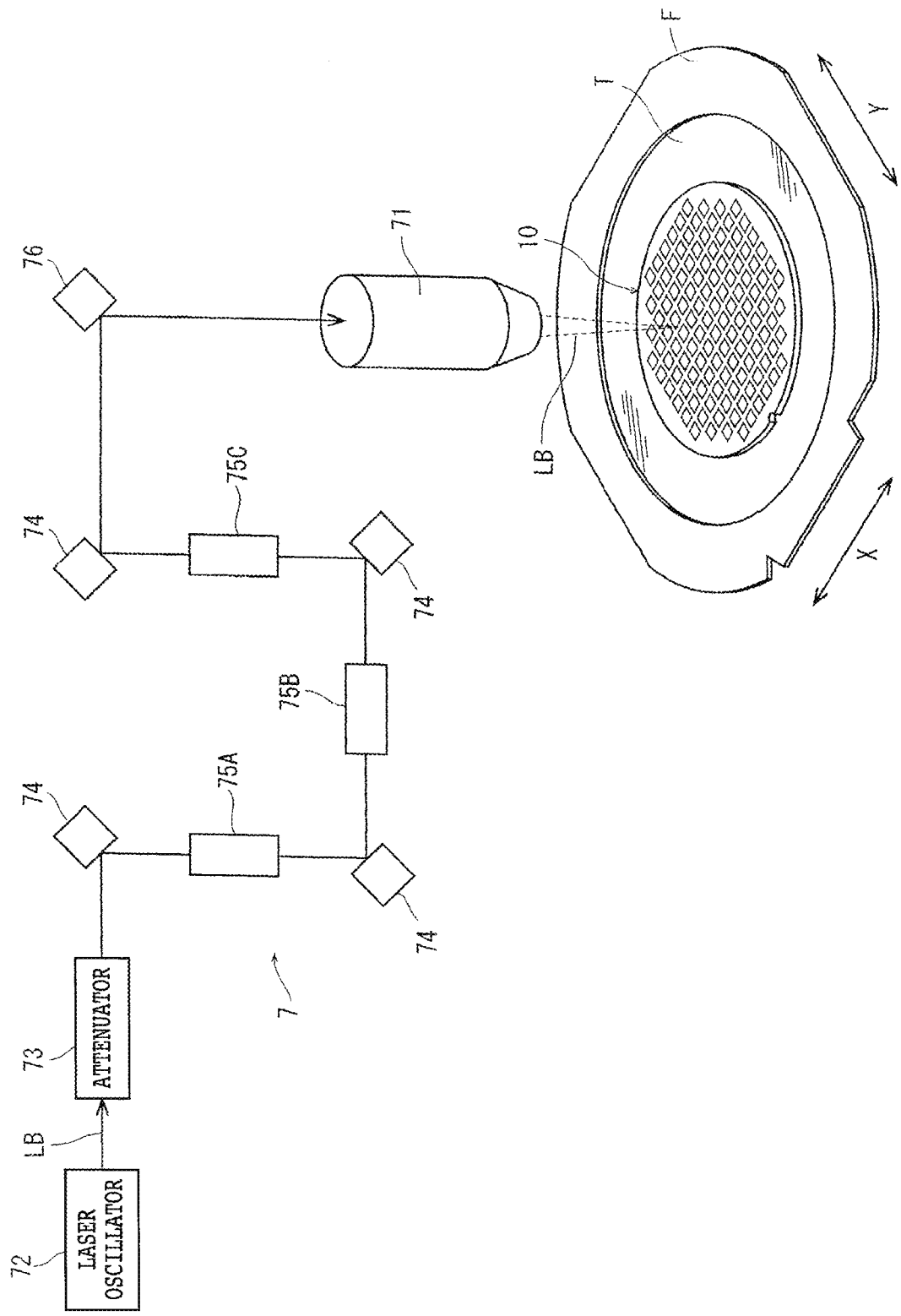
FIG. 2 is a block diagram depicting an outline of a laser beam applying unit mounted to the laser applying apparatus depicted in FIG. 1.

FIG. 2 depicts a block diagram illustrating an outline of the above-mentioned laser beam applying unit 7. The laser beam applying unit 7 includes, as appropriate, a laser oscillator 72 that emits a laser beam LB, an attenuator 73 that adjusts the output of the laser beam LB emitted by the laser oscillator 72, a light condenser 71 that converges the laser beam LB on the wafer 10 held by the above-mentioned chuck table 35, a plurality of (in the present embodiment, four) variable mirror assemblies 74 which are each an optical part assembly that is disposed between the laser oscillator 72 and the light condenser 71 and in which the optical axis of the light reflected is variable, and a fixed mirror 76 that modifies the optical path direction into a predetermined direction.

Further, in the optical system in the above embodiment, optical systems 75A to 75C disposed in a desired manner according to the form of laser processing are included between the variable mirror assembly 74 and other variable mirror assemblies 74. The optical systems 75A to 75C may be, for example, an assembled lens in which a plurality of lenses are combined, a polarizing plate such as a ½ wavelength plate, spot forming means that shapes the spot shape by a slit, or the like. The plurality of variable mirror assemblies 74 in the present embodiment are provided for adjusting the optical axis of the laser beam LB reflected by the variable mirror assemblies 74, and adjust the angle of each variable mirror assembly 74 to adjust the optical axis which would be deviated during passage through the above-mentioned optical systems 75A to 75C, whereby the focal point of the laser beam LB can be accurately positioned at that position of the wafer 10 which is to be processed.

The variable mirror assembly 74 which is the optical part assembly configured based on the present invention will be further specifically described with reference to FIGS. 3 and 4. On the upper side in FIG. 3, an exploded perspective view of the variable mirror assembly 74 is depicted, and, on the lower side in the figure, the variable mirror assembly 74 in an integrated state in which the configurations depicted on the upper side are combined with one another is depicted.

The variable mirror assembly 74 illustrated includes a mirror main body 740 including a mirror support section 742 that supports a mirror 741 on a projected one end part side and a base 743 that is formed on the opposite side of the mirror support section 742 from the mirror 741, a casing 744 that has an opening 744a in which the mirror support section 742 is to be exposed and that accommodates the mirror main body 740, a plurality of driving sections 746 that are disposed on a bottom plate 745 provided for closing the opposite side of the opening 744a of the casing 744 and that oscillate the base 743, and a bellows seal 747 that fills up a gap between the opening 744a and the mirror main body 740. The bellows seal 747 is, for example, a metallic bellows formed from a thin metallic sheet, or a resin bellows formed from fluororesin.

Figure 3:
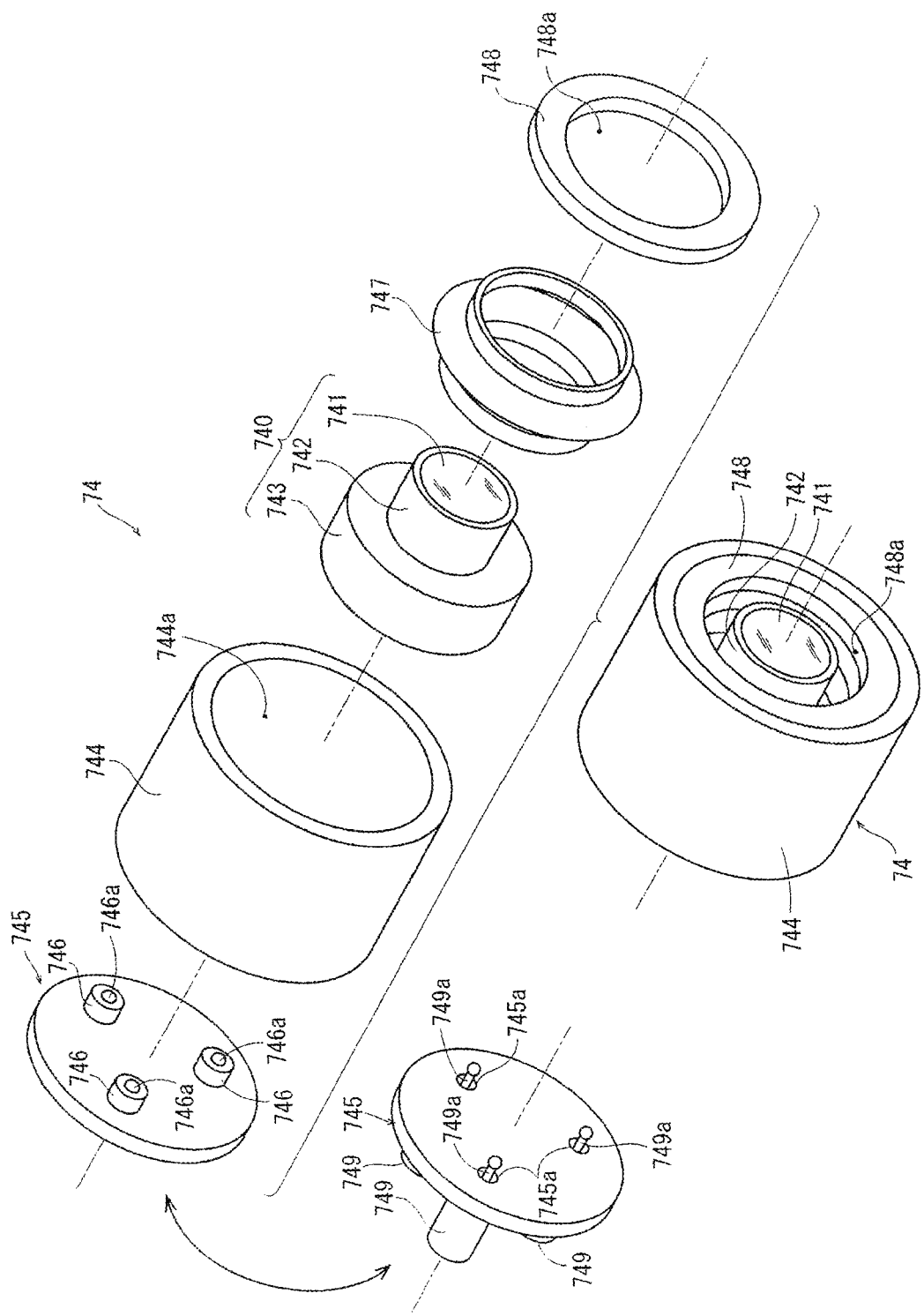
FIG. 3 is an exploded perspective view of an optical part assembly included in the laser beam applying unit depicted in FIG. 2 and a perspective view of the optical part assembly in an integrated state.
Figure 4A:
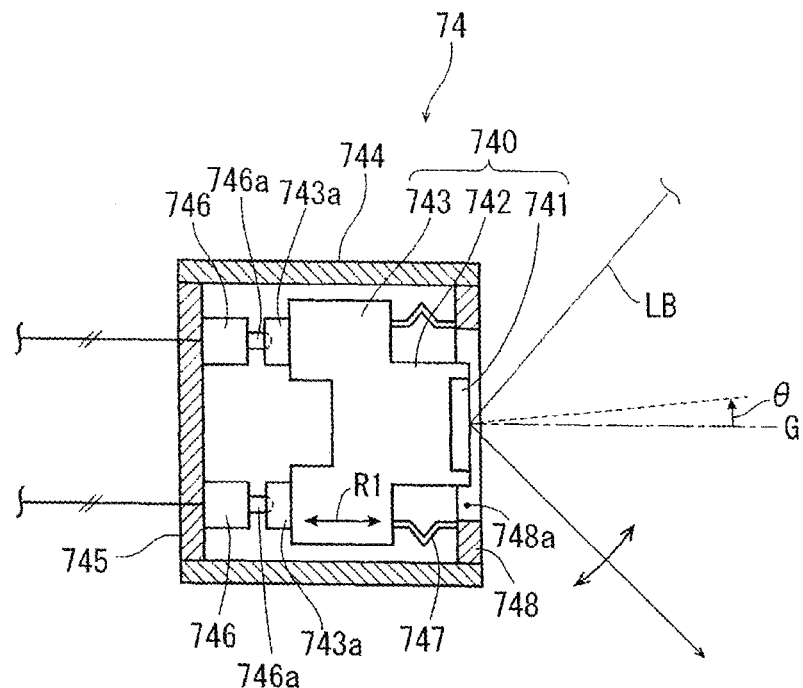
FIG. 4A is a schematic sectional view of the optical part assembly depicted in FIG. 3.

As understood with reference to FIG. 3 and FIG. 4A depicting, in section, the inside configuration of a part of the configuration of the variable mirror assembly 74 depicted in FIG. 3, the mirror main body 740 of the variable mirror assembly 74 in the present embodiment is supported by driving pins 746a of the above-mentioned three driving sections 746 on a rear surface side of the base 743 (on the side opposite to the mirror 741), one end of the bellows seal 747 makes contact with a front surface side of the base 743, the bellows seal 747 closes a part of the opening 744a of the casing 744, and the other end of the bellows seal 747 makes contact with and is clamped by a ring member 748 having an opening 748a, to thereby be held. The driving sections 746 are disposed at equally spaced positions at intervals of 120° as viewed from the center of the bottom plate 745, and the tip of each driving pin 746a makes contact with a driven section 743a disposed at a position corresponding to each driving pin 746a.

Each of the above-mentioned driving sections 746 is configured, for example, by a piezoelectric element actuator (piezoelectric element). By adjusting a voltage applied on the piezo-actuator of the driving section 746, the projecting amount of the driving pin 746a projecting from each driving section 746 is each adjusted, whereby, for example, the base 743 is oscillated in the direction of an arrow R1 depicted in FIG. 4A, and, more specifically, an optical axis G of the mirror 741 can be adjusted into any direction at any angle θ. In this instance, the bellows seal 747 is deformed, whereby the orientation of the mirror 741 is adjusted, while the hermetic closure of the gap between the opening 744a and the mirror main body 740 is kept. As a result, in performing laser processing of the wafer 10 held by the chuck table 35 of the above-mentioned holding unit 3, the orientation of the surface of the mirror 741 of each variable mirror assembly 74 is adjusted into any direction and at any angle, whereby the optical path of the laser beam LB emitted from the above-mentioned laser oscillator 72 can be adjusted, and the focal point of the laser beam LB can be positioned at a desired position in the wafer 10.

Figure 4B:
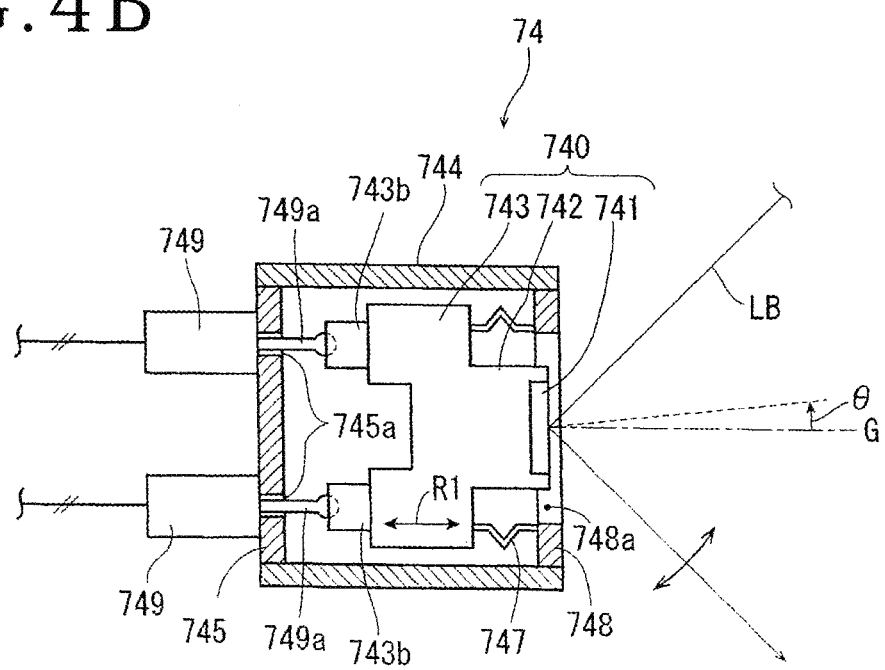
FIG. 4B is a schematic sectional view depicting another embodiment of the optical part assembly depicted in FIG. 4A.

The present invention is not limited to the above-described embodiment; for example, another embodiment separately depicted on a left lower side in FIG. 3 and in FIG. 4B may be adopted. In the other embodiment, in place of the driving sections 746 disposed on the above-mentioned bottom plate 745, driving sections 749 each including an unillustrated pulse motor and a connection section 749a advanced and retracted by rotation of the pulse motor may be disposed. Similarly to the above-mentioned driving sections 746, the driving sections 749 also are disposed in three at equal intervals of 120° as viewed from the center of the bottom plate 745 and pass through three through-holes 745a formed in the bottom plate 745, and, as depicted in FIG. 4B, the connection sections 749a are connected to three driven sections 743b disposed at positions corresponding to the driving sections 749. By putting the pulse motor constituting each driving section 749 into forward rotation or reverse rotation, the projecting amounts of the three connection sections 749a are each adjusted, and, with the base 743 oscillated in the direction of the arrow R1, the optical axis G of the mirror 741 can be adjusted into any direction at any angle θ. As a result, in performing laser processing of the wafer 10 held by the chuck table 35 of the above-mentioned holding unit 3, the orientation of the surface of the mirror 741 of each variable mirror assembly 74 is adjusted in any direction and at any angle, whereby the optical path of the laser beam LB emitted from the laser oscillator 72 can be adjusted, and the focal point of the laser beam LB can be positioned at a desired position in the wafer 10.

As has been described above, the variable mirror assembly 74 in the present embodiments includes the driving sections 746 or 749 that are disposed on the bottom plate 745 of the casing 744 and oscillate the base 743 of the mirror main body 740, and includes the bellows seal 747 that fills up the gap between the opening 744a of the casing 744 and the mirror main body 740. As a result, even if fine dust is generated at the driving sections 746 for oscillating the base 743 or at the parts where the driving pins 746a of the driving sections 746 make contact with the driven sections 743a, the problem that the dust is scattered into the region of the optical path of the laser beam LB and contaminates the optical path is dissolved.

Note that the position where to dispose the variable mirror assembly 74 configured based on the present invention is not limited to that in the above-described embodiment, and any location where the optical path of the light applied should be variable can be adopted. For example, the variable mirror assembly 74 configured based on the present invention may be disposed on the fixed mirror 76 of the laser beam applying unit 7 which has been described in reference to FIG. 2.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical part assembly comprising:
   a mirror main body including a base and a mirror support section that is formed integral with the base and having a projected tip;
   a mirror mounted on the projected tip of the mirror support section;
   a casing that accommodates the mirror main body, the casing having at its tip part an opening in which the mirror support section is exposed, and the casing having a rear end part closed with a bottom plate;
   a plurality of driving sections that are disposed on the bottom plate of the casing and act on the base to swing the base;
   a ring member that has an opening and is fixed to a front end part of the casing; and
   a bellows seal of which one end makes contact with a front end of the base, and the other end makes contact with the ring member to surround the mirror support section.

2. The optical part assembly according to claim 1, wherein each of the driving sections includes a piezo-actuator and a pin which is connected to the piezo-actuator and a tip of which makes contact with the base.

3. The optical part assembly according to claim 1, wherein each of the driving sections is mounted on outside of the bottom plate, and a connection member inserted into a through-hole formed in the bottom plate connects the driving section and the base.

* * * * *